April 9, 1963   M. J. SMITH   3,084,615
ROTARY ROAST RACK
Filed Aug. 12, 1960
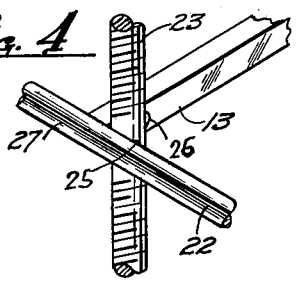
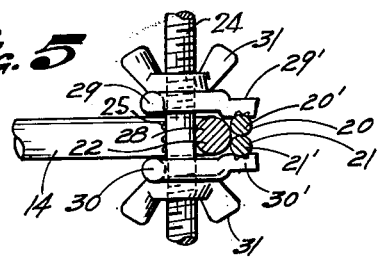
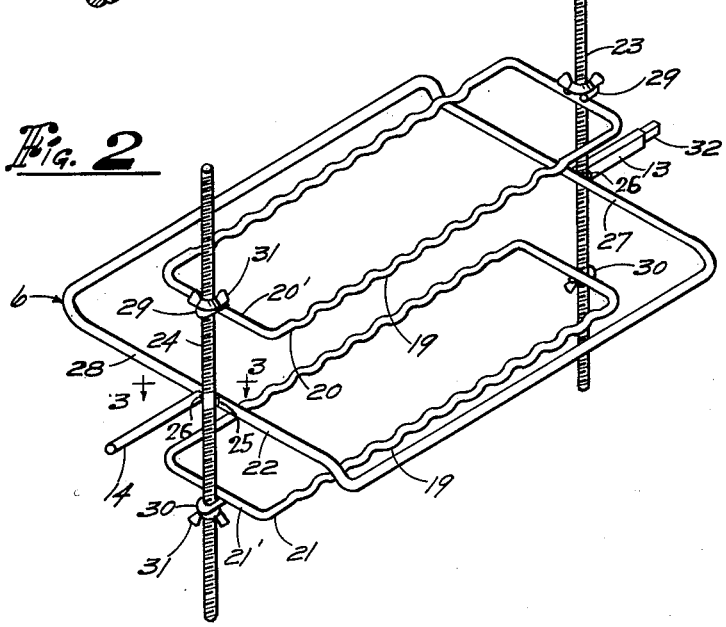
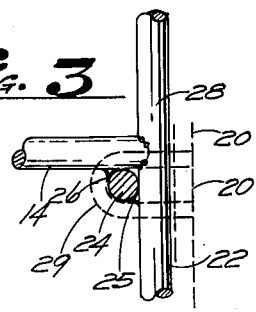
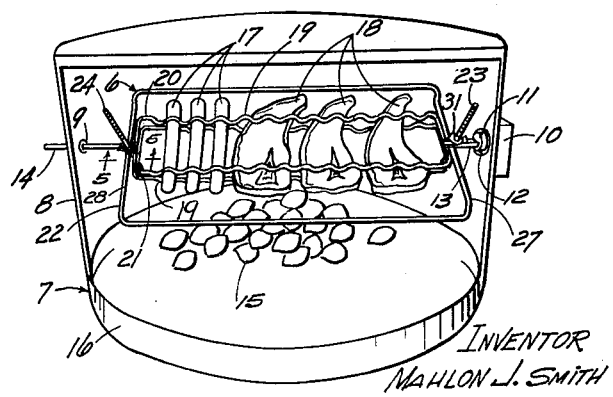
INVENTOR
MAHLON J. SMITH
ATTY.

3,084,615
Patented Apr. 9, 1963

3,084,615
ROTARY ROAST RACK
Mahlon J. Smith, Niles, Mich., assignor to The Washburn Company, Worcester, Mass., a corporation of Massachusetts
Filed Aug. 12, 1960, Ser. No. 49,339
4 Claims. (Cl. 99—393)

This invention relates to rotary roast racks especially designed for use with outdoor broiler units using charcoal as the fuel, the present improvements being more particularly:

(1) The welding of the threaded studs to the ends of the main frame alongside the coaxially aligned supporting and driving shaft extensions, combined with the welding of U-shaped wire loops to the ends of the meat caging and clamping frames, one on top of the upper frame and the other on the bottom of the lower frame at each end for a loose slidable connection with the opposite ends of the adjacent threaded stud, enables bringing the frames into much closer relationship, thereby enabling the gripping therebetween of thinner slices of meat easily and the toasting of slices of bread also, if desired;

(2) The clamping frames are formed from wire of a diameter not much smaller than the diameter of the studs, and the frames and studs are therefore adapted to flex in the clamping of larger roasts, turkeys, chickens, small pigs and the like, and, being resilient, are adapted to return to original shape afterwards, the resilience being of special importance also from the standpoint of compensating for shrinkage of the meat in a broiling or roasting operation, so that there is less danger of having the meat drop out accidentally, and the resilience being also an important advantage in the adjusting of the wing nuts on the studs to raise or lower the mass in relation to the axis of rotation to secure a fairly balanced condition, without danger of the meat becoming loose enough to drop out while the adjustment is being made, as it is necessary in balancing the rack to loosen a nut on one side and tighten the companion nut on the other side to the same extent, in order to shift the weight relative to the axis of rotation, and (3) The U-shaped wire loops for operation on the studs are large in diameter in relation to the diameter of the studs for loose engagement on the studs, and are made of round wire of large enough diameter in relation to the threads on the studs to provide rounded surfaces on the loops so that they will ride smoothly up or down on the studs despite the flexed condition of the frames and studs, and therefore not only enable secure clamping of meat without too much effort in the tightening of the wing nuts but also facilitate fine adjustment of the mass in clamped condition on the rack as required for a well balanced condition, and smooth quiet operation and reduced wear and tear on the drive mechanism.

The longitudinal members on both sides of the elongated rectangular frames between which the food to be gripped broiled or roasted is gripped, are corrugated so that frankfurters, ears of corn and other similar pieces that could not otherwise be held securely can be handled satisfactorily without having to rely upon too tight clamping, despite the appreciable length of these frames, the good hold on the food being partly attributable to the corrugations, but also in a large measure to the way in which the frames are mounted at their opposite ends on the threaded studs and adapted to be forced together resiliently.

The invention is illustrated in the accompanying drawing, in which—

FIG. 1 is a perspective view of an outdoor broiler unit in which a rotary roast rack made in accordance with my invention has been installed;

FIG. 2 is a perspective view of the rotary roast rack removed from the broiler and shown on a larger scale with the clamping frames spread apart to better illustrate the construction;

FIG. 3 is a sectional detail on the line 3—3 of FIG. 2 to better illustrate the welding of the studs to the ends of the main frame alongside the coaxially aligned supporting and driving shaft extensions;

FIG. 4 is an enlargement of a portion of FIG. 2 to better illustrate this same feature at the other end of the main frame, and FIG. 5 is a sectional detail on the line 5—5 of FIG. 1 on the same enlarged scale as FIGS. 3 and 4 to better illustrate how the mounting of the U-shaped wire loops on the ends of the clamping frames in this novel manner enables bringing these frames much closer together than heretofore to grip thinner slices of meat, while the corrugations in the frames enable secure holding of frankfurters, ears of corn, and similar pieces without as tight clamping as would otherwise be necessary.

The same reference numerals are applied to corresponding parts throughout these views.

Referring to the drawing, the reference numeral 6 designates the rotary roast rack of my invention generally, shown in FIG. 1 as installed in an outdoor barbecuing unit 7, the hood or cover portion 8 of which has a bearing 9 in one side wall thereof and a housing 10 mounted on the outer side of the opposite side wall containing the usual reduction gearing to enable slow speed driving of the rack 6 by means of an electric motor (not shown). Only the hub portion 11 of the slow speed drive gear is shown as projecting through an opening 12 in the side wall for driving connection with the square shaft extension 13 on the adjacent end of the rack 6, the coaxially arranged supporting round shaft extension 14 on the other end of the rack being entered in the bearing 9 previously mentioned for rotary support of the rack over the charcoal fire bed 15 in the base 16 of the broiler unit. Three frankfurters are indicated at 17 and three steaks at 18 as clamped firmly but resiliently between the corrugated longitudinal extending side portions 19 of the two rectangular wire frames 20 and 21 which turn with the larger and heavier rectangular wire main frame 22. Threaded studs 23 and 24 which are disposed at right angles to the plane of the main frame 22 and substantially parallel to one another at opposite ends of said frame are welded on one side, as indicated at 25 in FIG. 3, to the ends of the main frame 22 and on another side, as indicated at 26 in FIG. 3, to the side of the adjacent shaft extension, thus leaving the top and bottom surfaces of the cross-portions 27 and 28 at the opposite ends of the main frame 22 clear of any projections that would interfere with bringing the U-shaped wire loops 29 and 30 projecting from the ends of the clamped frames 20 and 21 into close contact with the top and bottom of the crossportions 27 and 28 of the main frame 22, as necessary where the frames 20 and 21 are brought close together to grip frankfurters, as at 17 in FIG. 1, or thin slices of meat, like chops, for example, or like the steaks illustrated at 18 in FIG. 1. On occasion one might even wish to grip slices of bread between the frames for toasting, and the present construction makes that possible. The fact that the U-shaped wire loops 29 and 30 have the ends 29′ and 30′ of the arms thereof offset inwardly, as illustrated in FIG. 5, and spot-welded to the cross-portions 20′ and 21′ on the ends of the frames 20 and 21, respectively, is also an important factor in enabling bringing the frames 20 and 21 into closer contact, as best appears in FIG. 5. The loops 29 and 30 are large enough in diameter in relation to the diameter of the studs 23 and 24, as indicated in dotted lines in FIG. 3, to fit loosely thereon and accordingly slide freely up or down on the studs in the adjusting of the wing nuts 31 on the studs, and inasmuch as these wire loops are made of round wire of large enough diameter in relation to the threads on the studs there is no likelihood that the loops will ever fail to ride smoothly up or down on the studs despite the flexed condition of the frames 20 and 21 and studs 23 and 24, and, of course, that is very important not only from the standpoint of enabling easier tightening of the wing nuts in the clamping of the meat or whatever is being gripped between the frames but also because it becomes necessary to make fairly fine adjustments of the mass in clamped condition up or down with respect to the axis of rotation of the shafts 13 and 14 to obtain a well balanced condition, if there is to be smooth, quiet operation and reduced wear and tear on the drive mechanism, the balancing of the load being done by loosening the nuts 31 on one side of the axis and correspondingly tightening the nuts 31 on the other side of the axis. The flexibility and resilience of the frames 20 and 21 in relation to the heavier and more rigid main frame 22, and the flexibility and resilience of the studs 23 and 24 are both important especially in the clamping of larger roasts and turkeys, chickens and small pigs when, of course, the frames 20 and 21 are spread much farther apart, as illustrated, for example, in FIG. 2, because this enables tightening of the wing nuts 31 beyond the point where initial clamping might seem to be necessary, having in view the anticipated shrinkage of the meat in the broiling or roasting thereof, when, of course, the resilience of the frames insures continued holding of the meat against likelihood of its being dropped accidentally, in the event the operator does not tighten the wing nuts 31 promptly. Sometimes further adjustments of the wing nuts 31 becomes necessary in the course of the broiling or roasting operation in order to restore good balance.

In passing, attention is called to the reduced coaxial square end portion 32 provided on the extremity of the square drive shaft extension 13, which is adapted to fit in a square bore in hubs similar to hub 11 in other makes of broiler units for which the larger inner end portion of the shaft 13 would be too large. In that way the rack 6 is useful interchangeably in a much larger number of makes of broiler units than it would otherwise if the shaft 13 were of the same size from end to end.

In operation, during the broiling or roasting operation, it is a simple matter to stop the drive motor for a while and tighten the nuts 31 to compensate for shrinkage of the meat and/or correct for an unbalanced condition. The flexibility and resilience of the frames 20 and 21 and of the studs 23 and 24, and the consequent bowing of these parts in the clamping of a roast, for example, makes it unnecessary to tighten the nuts 31 too often during a broiling or roasting operation. The loops 29 and 30 fitting loosely and having rounded surfaces thereon to glide over the threads on the studs fairly easily regardless of the flexed condition of the frames and studs account for the fact that there is never any noticeable binding of the parts, and hence, neither of the frames 20 and 21 gets caught in a certain position and fails to follow the associated wing nuts 31 in their adjustment up or down on the studs 23 and 24. Prior constructions failed to operate so smoothly under all conditions of adjustment and without this nicety of adjustment, users were frequently compelled to put up with unbalanced conditions that imposed unnecessary strain upon the driving mechanism and made the operation noisy and annoying. The present construction, by virtue of the corrugations 19, enables the holding of frankfurters and sausages which were very difficult, if not impossible, to handle with prior constructions, and also to grip ears of corn and similar pieces, and do this without necessitating such a tight clamping action as other prior constructions necessitated, and these corrugations also act as non-skid teeth in the gripping of slices of meat and steaks, and chops, all as clearly illustrated at 17 and 18 in FIG. 1. The special way in which the studs 23 and 24 are mounted on the opposite ends of the main frame 22, as shown in FIGS. 3 and 4, and the special way in which the U-shaped wire loops 29 and 30 are formed and mounted on the opposite ends of the clamping frames 20 and 21, as shown in FIG. 5, all cooperate toward enabling bringing the frames 20 and 21 into much closer abutment and that enables the holding of thinner slices of meat easily.

It is believed the foregoing description conveys a good understanding of the objects and advantages of my invention. The appended claims have been drawn to cover all legitimate modifications and adaptations.

I claim:

1. A rotary roast rack comprising a substantially horizontal generally rectangular open main frame having coaxially arranged horizontal supporting shafts secured to its opposite ends on the longitudinal center line thereof in coplanar relationship therewith for its rotary support, vertical threaded studs in parallel relationship to one another at opposite ends of said frame and fixed normally in fairly rigid right-angular relationship thereto, manually adjustable nuts threaded on said studs above and below said frame, said studs being resilient and flexible toward each other, and a pair of horizontal meat caging and clamping frames of flexible resilient wire construction of shorter length and less width than said main frame so as to fit inside the latter and having stud encircling loops projecting horizontally outwardly from the opposite ends thereof from the top of the upper one of said clamping frames and from the bottom of the lower one of said clamping frames, respectively, loosely slidably engaged on the studs above and below said main frame between it and said nuts, said clamping frames being movable inwardly substantially into contact with one another within said main frame, thereby enabling the clamping therebetween of thin pieces of meat or other food.

2. A device as set forth in claim 1 wherein the inner end portions of said loops that are secured to the clamping frames are offset with respect to the outer end portions that encircle the studs, whereby to permit still closer disposition of said clamping frames to clamp still thinner pieces of meat or other food.

3. A device as set forth in claim 1 wherein said clamping frames are of generally rectangular form and of the same dimensions and adapted to register with one another in clamping relationship, each of said frames having longitudinally extending wires on opposite sides thereof which are bent at points uniformly closely spaced lengthwise thereof to zig-zag form in a plane at right angles to the plane of said frame for the better gripping between said frames of thin pieces of meat or other food and especially elongated pieces, like frankfurters, carrots and the like, which when placed crosswise relative to the longitudinally extending wires fit in spaces defined between the longitudinally extending wires of said frames at the zig-zag bent portions.

4. A device as set forth in claim 1, wherein each of the studs is disposed alongside of and in transverse abutting relationship to one of the shafts and the outside of said main frame and fastened on two sides to the sides of said shaft and frame, leaving the top and bottom surfaces of said shafts and frame substantially parallel and clear of projections for good abutment by the loops on said clamping frames so as to enable closer bringing together of the clamping frames.

References Cited in the file of this patent

UNITED STATES PATENTS

| | | |
|---|---|---|
| 1,359,749 | Shey | Nov. 23, 1920 |
| 1,594,187 | Adami | July 27, 1926 |
| 1,651,868 | Calvo | Dec. 6, 1927 |
| 1,945,165 | Smith | Jan. 20, 1934 |
| 2,102,097 | Sherman | Dec. 14, 1937 |
| 2,320,304 | Rosset | May 25, 1943 |
| 2,689,518 | Beach | Sept. 21, 1954 |